(12) United States Patent
Karrer

(10) Patent No.: US 6,170,897 B1
(45) Date of Patent: *Jan. 9, 2001

(54) CARGO ANCHORING AND PROTECTION SYSTEM INCLUDING BED LINER

(76) Inventor: Robert B. Karrer, 3489 Fulton Ave., Smithers, British Columbia (CA), V0J 2N0

( * ) Notice: Under 35 U.S.C. 154(b), the term of this patent shall be extended for 0 days.

This patent is subject to a terminal disclaimer.

(21) Appl. No.: 09/176,089

(22) Filed: Oct. 21, 1998

Related U.S. Application Data

(63) Continuation-in-part of application No. 08/807,752, filed on Feb. 27, 1997, now Pat. No. 5,882,058.

(51) Int. Cl.⁷ .................................................... B60R 13/01
(52) U.S. Cl. ............................................................. 296/39.2
(58) Field of Search ................................... 296/39.1, 39.2

(56) References Cited

U.S. PATENT DOCUMENTS

| 3,912,325 | * | 10/1975 | Sudyk | 296/39.2 |
| 4,029,354 | * | 6/1977 | Valeri | 296/39.2 |
| 4,575,146 | | 3/1986 | Markos | 296/39 R |
| 4,936,724 | | 6/1990 | Dutton | 410/110 |
| 4,944,612 | | 7/1990 | Abstetar et al. | 296/39.2 |
| 4,958,876 | | 9/1990 | Diaco et al. | 296/39.2 |
| 4,969,784 | | 11/1990 | Yanke | 410/104 |
| 5,154,478 | | 10/1992 | Erickson et al. | 296/39.2 |
| 5,228,736 | * | 7/1993 | Dutton | 296/39.2 |
| 5,419,602 | | 5/1995 | VanHoose | 296/39.1 |
| 5,584,521 | | 12/1996 | Hathaway et al. | 296/36 |
| 5,882,058 | * | 3/1999 | Karrer | 296/39.2 |

FOREIGN PATENT DOCUMENTS

2029620 * 5/1992 (CA) ................................ 296/39.21

* cited by examiner

Primary Examiner—Sherman Basinger
(74) Attorney, Agent, or Firm—Christopher R. Scott

(57) ABSTRACT

A cargo anchoring and protection system is provided using various embodiments of bed liners some of which include storage compartments to make use of the space surrounding wheel wells in a pickup truck cargo bed. The bed liners can also include connector strips to facilitate using liners made up of several parts and also to provide for attachment of loads to the floor of the cargo bed of the pickup truck.

15 Claims, 8 Drawing Sheets

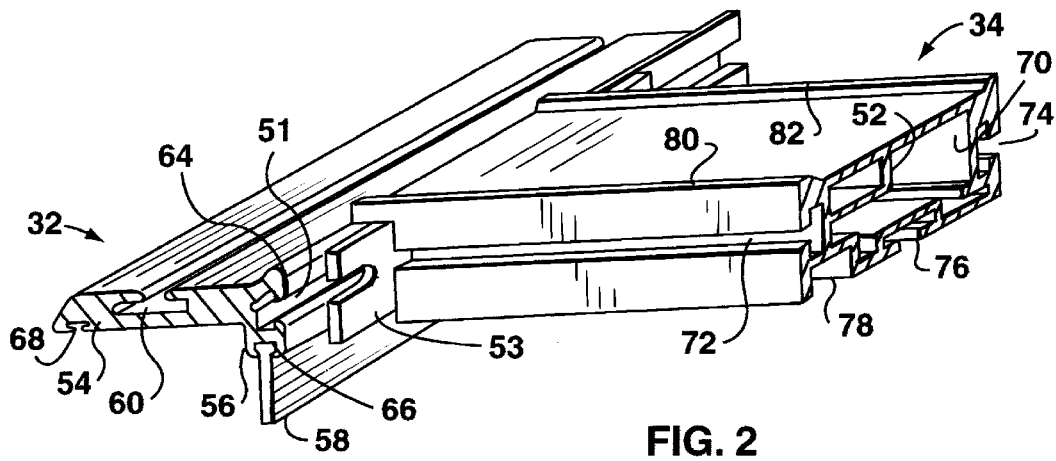
FIG. 2
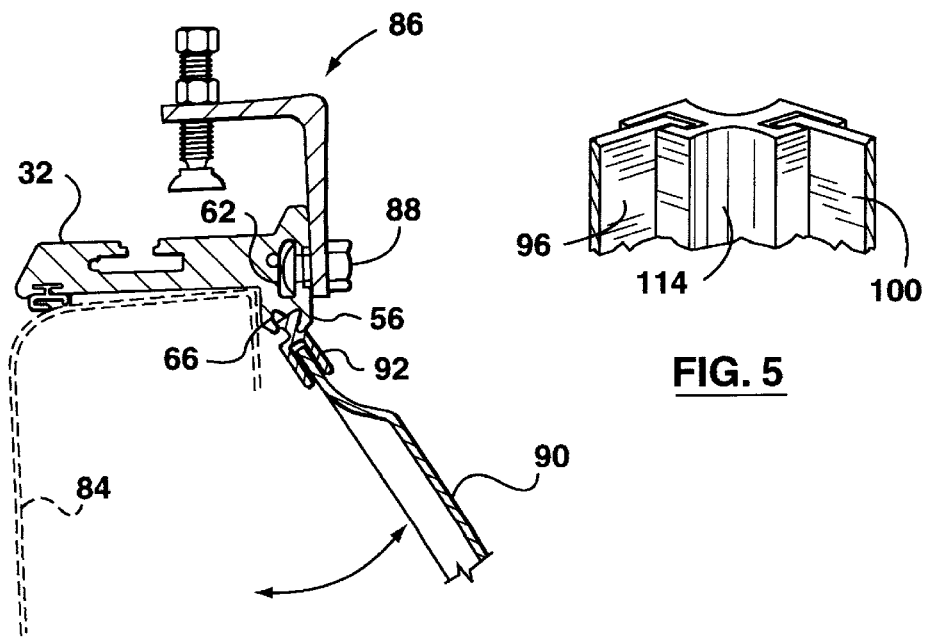
FIG. 3
FIG. 5

US 6,170,897 B1

CARGO ANCHORING AND PROTECTION SYSTEM INCLUDING BED LINER

This application is a continuation-in-part of application Ser. No. 08/807,752 filed on Feb. 27, 1997 which has become U.S. Pat. No. 5,882,058.

FIELD OF THE INVENTION

This invention relates to a cargo anchoring and protection system for the cargo bed of a pickup truck, and more particularly to bed liners used in the system.

BACKGROUND OF THE INVENTION

Accessories such as cab guards, bed liners, protective bed rail caps and cargo enclosures have been used in the past on pickup trucks. They are generally designed and manufactured without consideration being given to the relationship between the accessories. In fact the accessories often conflict with one another. Furthermore, most of the accessories offered today either attempt to protect the truck bed area or enhance cargo carrying capacity, but not both. Accordingly, a need exists for a cargo anchoring and protection system which allows the use of all desired accessories to be used in conjunction with one another. Furthermore a need exists for a system which is capable of dividing the cargo area into more usable compartments, securely carrying a wide variety of cargo, and protecting the pickup bed area from damage. This invention is directed to improvements incorporating the bed liner which is commonly used to provide a working enclosure within the cargo bed. Such liners take many forms including one piece structures which are relatively inexpensive but bulky to store and transport.

One common disadvantage of bed liners is that they tend to make it difficult to tie down cargo and they are not integrated into other components often found on a pick-up truck, such as rails mounted on the side walls of the cargo bed.

Accordingly, it is among the objects of this invention to provide an improved cargo anchoring and protection system which includes an improved bed liner, and more particularly to provide improved bed liners for use in pickup trucks.

SUMMARY OF THE INVENTION

In one of its aspects, the invention provides a cargo anchoring and protection system having anchor rails for attachment to the side walls of a cargo bed of a pickup truck, a bed liner for placing in the cargo bed and having side sections, the anchor rails including structure for attachment of the side sections.

In another of its aspects, the invention provides a cargo bed liner for use in a cargo bed of a pickup truck and including side sections defining storage compartments.

In yet another of its aspects the invention provides a bed liner having side sections and separate floor sections and connector strips for attachment to the floor of a cargo bed to locate the side and floor sections in the cargo bed, the strips preferably including T-slots for attaching anchors to secure loads in the cargo bed.

These and other aspects of the invention will be better understood with reference to the following description taken in combination with the accompanying drawings.

BRIEF DESCRIPTION OF THE DRAWINGS

FIG. 2 is an isometric view of a portion of the cargo anchoring and protection system and showing an anchor rail coupled to an anchor with a portion of a bed liner engaged in the rail;

FIG. 3 is a cross-sectional view of the anchor rail with an alternative embodiment of bed liner including an interlocking member connecting the bed liner to the anchor rail;

FIG. 5 (drawn adjacent FIG. 3) is an isometric view to a larger scale than that used for FIG. 4 to show a portion of the bed liner side wall and the front wall engaged in an extruded corner locking device of the system;

DESCRIPTION OF THE PREFERRED EMBODIMENT(S)

While the invention will be described in conjunction with exemplary embodiments, it will be understood that it is not intended to limit the invention to such embodiments. On the contrary, it is intended to cover all alternatives, modifications and equivalents as may be included within the spirit and scope of the invention as defined by the appended claims.

Figure 1:
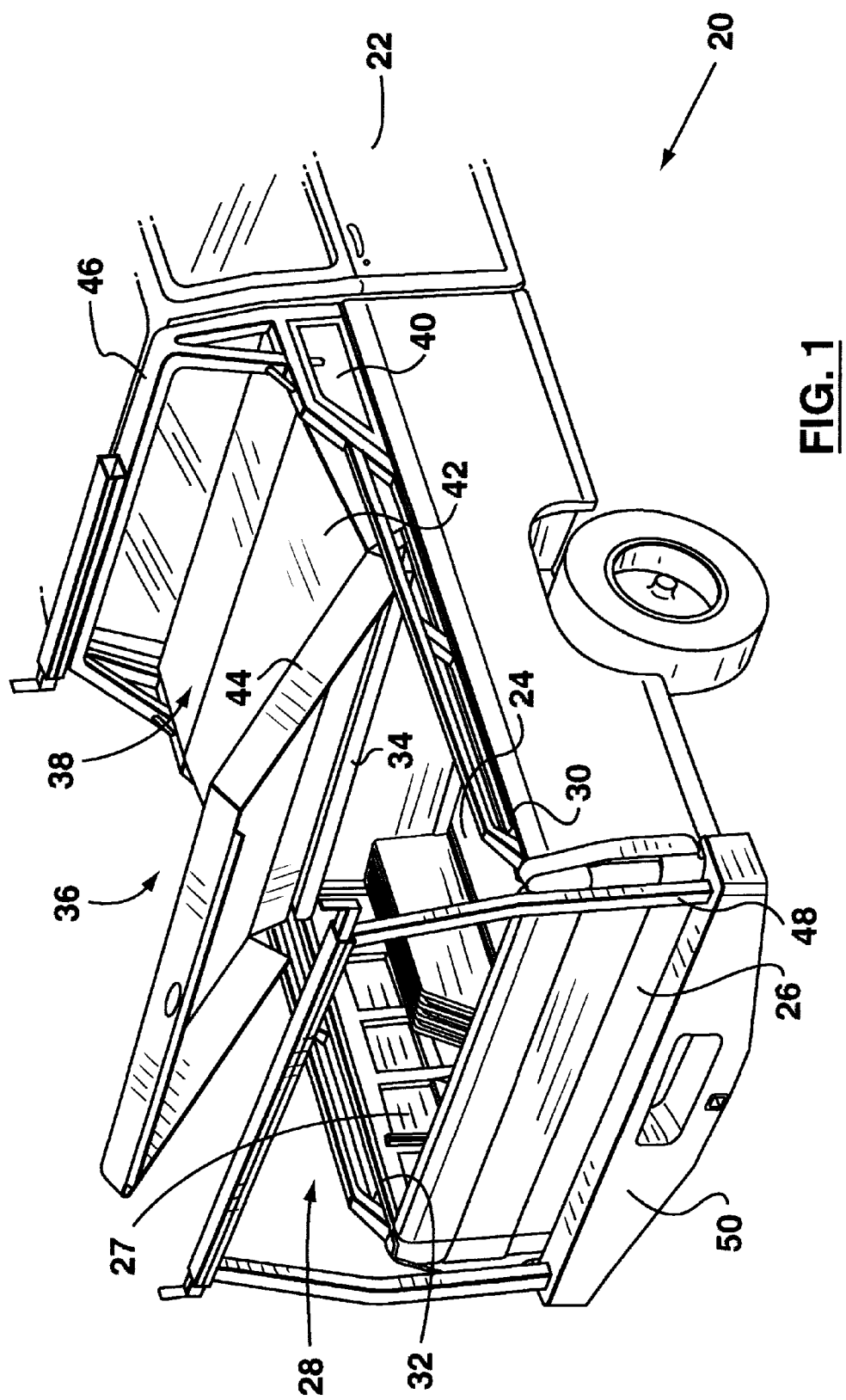
FIG. 1 is an isometric view of a rear part of a pickup truck having a cargo anchoring and protection system incorporating a bed liner according to one of the preferred embodiments of the invention.

Referring now to the drawings, FIG. 1 illustrates a conventional pickup truck designated generally by the numeral 20 and including a cab 22 and a cargo bed 24 having a tailgate 26. A bed liner 27 is mounted in the bed 24 of the truck 20 along with a variety of exemplary parts which can be used as part of a cargo anchoring and protection system 28. As seen in FIG. 1, the attachment system 28 includes a pair of anchor rails 30, 32. An extruded cross bed anchor beam 34 extends between the rails 30, 32 and an enclosure 36 is shown in an open position to view the cargo area of the cargo bed 24. The enclosure includes an open-ended front storage compartment 38 having end doors 40 providing access into the compartment, a centre lid 42 and a rear lid 44. A cab guard 46 is optionally used in combination with the compartment 38 and this guard can form part of a load carrying structure which includes a frame 48 attached to a bumper 50 of the pickup truck.

Referring now to FIG. 2, this isometric view illustrates some of the details of the attachment system also referred to as a cargo anchoring and protection system. Anchor rail 32 (which is similar to rail 30) is shown adjacent beam 34 and ready to receive fasteners (not shown) in T-slot 51 for engagement in end slots 55 (one of which is seen) of a plate 53 forming part of a mounting bracket 52 which is a sliding fit inside the extruded anchor beam 34. The fit is such that minor variations in the distance between the anchor rails 30, 32 can be accommodated.

Referring now specifically to the components of the cargo anchoring and protection system shown in FIG. 2, the anchor rail 32 is an elongated extruded member having a horizontal segment 54 adapted to rest on top of a side of the cargo bed 24 and a vertical segment 56 extending downwardly inside the cargo bed adjacent a flange of the wall. The vertical segment 56 is adapted to receive an optional member 58 typically formed for attachment to a bed liner, or possibly part of the bed liner engaged directly in the vertical segment 56. The horizontal and vertical segments 54, 56 define respective optional horizontal and vertical T-slots 60 and 51 to receive fasteners to retain anchoring devices, etc.

The inner top corner of the anchor rail 32 has an integral vertically protruding ridge 64 projecting as an extension of the vertical segment 56 and acting as a weather guard and guide rail.

The lower portion of the vertical segment 56 of the anchor rail 32 embodies a generally semi-circular elongate channel 66 designed to accept the removable interlocking member 58 which, as explained, could optionally be part of a liner for the bed of the pickup truck. A flexible bulb type seal may be provided in a suitable slot 68 to act as a weather seal between the anchor rail 32 and the pickup truck cargo bed on assembly.

The anchor rail 32 (and rail 30 seen in FIG. 1) can be attached directly to the wall of the cargo bed of the pickup truck using through bolts (not shown) engaged downwardly through the horizontal segment 54.

The anchor beam 34 extends between the anchor rails 30, 32 (FIG. 1) and receives two mounting brackets 52, one at each end, to permit attachment to the anchor rails 30, 32 at a selected location along the length of the rails.

It will be seen in FIG. 2 that the anchor beam 34 defines a generally rectangular opening 70 to receive the similarly shaped mounting bracket 52. Also, optional side T-slots 72, 74 are provided as well as a bottom T-slot 76 and recess 78, all for attachment and location of parts useful in a pick-up truck cargo bed.

The anchor beam also includes integrally formed upwardly extending side projections 80, 82 to act as guide rails and water drain ridges to guide rain water towards the anchor rails 30, 32 where the water is directed by the ridges 64 on the anchor rails 30, 32.

Returning to FIG. 1, the anchor beam 34 provides support where the centre lid 42 (behind the front storage compartment 38) meets the rear lid 44.

Reference is next made to FIG. 3 which again shows the anchor rail 32 in association with a side wall 84 of the cargo bed of a pickup truck. This view further illustrates the versatility of the anchor rail. A clamp 86 is attached to the vertical T-slot 62 using a suitable bolt 88. Also in this view, a side 90 of a bed liner is attached by an interlocking member 92 to the anchor rail 32 by engagement in the elongate channel 66 at the bottom of the vertical segment 56. The interlocking member 92 is shaped to receive the side wall 90 of the bed liner and extends into the slot 66 for limited rotation in the slot. The member 92 is trapped in the slot 66 but is free to slide longitudinally. The limited rotation (illustrated in FIG. 3) permits the side 90 to be positioned to slide past the wheel well before being located around the wheel well once it is fully engaged in the bed of the pickup truck.

Figure 4:
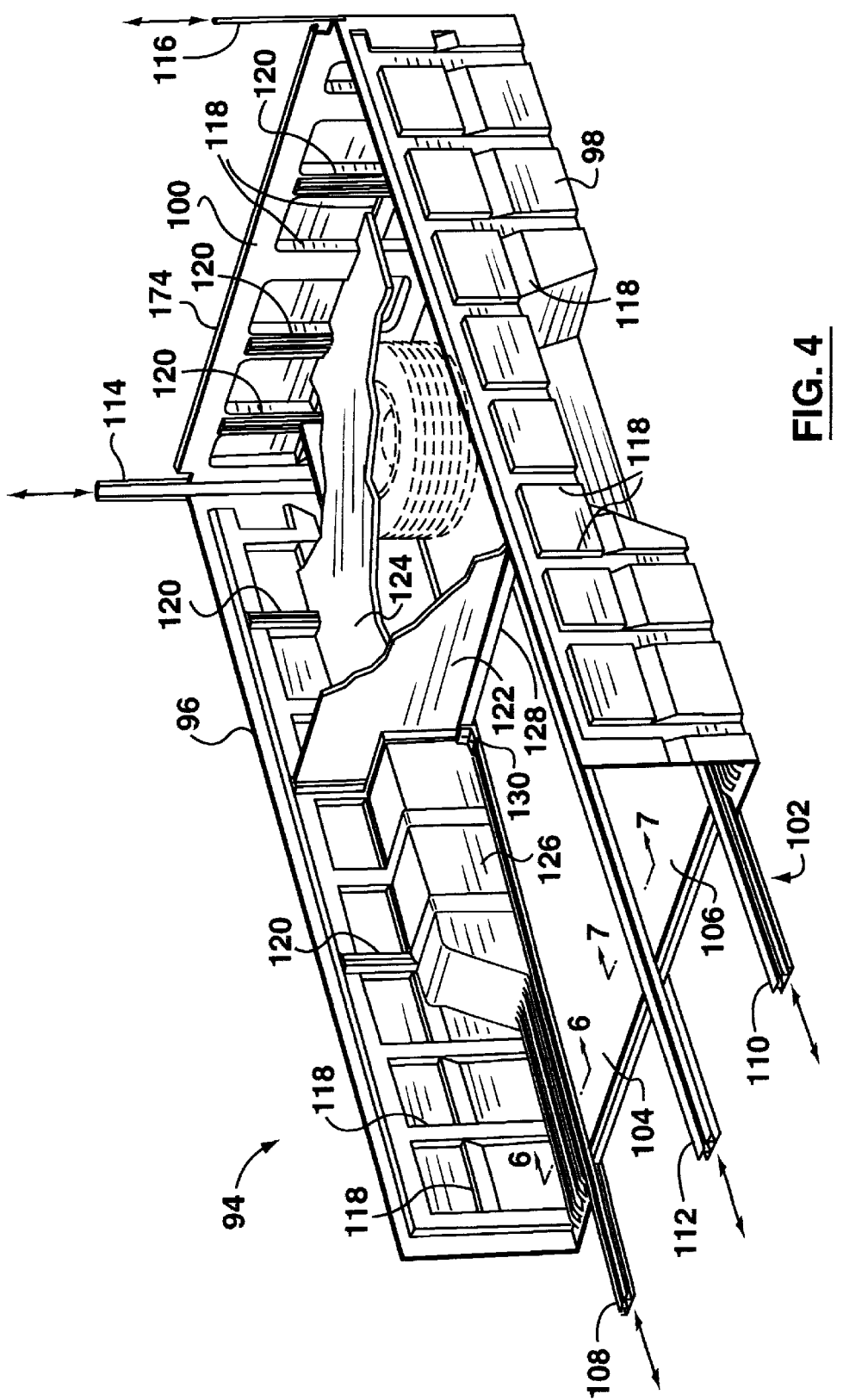
FIG. 4 is a partially exploded isometric view of an embodiment of a bed liner of the system and showing additional parts cut away to illustrate uses for the bed liner as part of the cargo anchoring and protection system, and illustrating the procedure used to assemble the bed liner.

An example of a bed liner which can be assembled using the structure shown in FIG. 3 is to be found in FIG. 4.

As seen in FIG. 4, a bed liner 94 consists of a pair of formed side sections 96, 98, a formed front segment 100, a multi piece floor 102 consisting of wood floor sections 104, 106, a pair of elongate side extrusions 108, 110 between the respective side sections 96, 98 and the floor sections 104, 106, and a central extrusion 112 between the floor sections 104, 106. The extrusions 108, 110 and 112 act as connector strips to locate and attach the side sections 96, 98 and floor sections 104, 106 to the floor of the cargo bed of the pickup truck. A pair of upright extruded corner pieces 114, 116 lock the front segment 100 to the respective side walls 96, 98 as better illustrated in FIG. 5. The bed liner side walls 96, 98 and the formed bed liner front segment 100 include a plurality of vertically and horizontally formed ribs 118 adapted to stiffen the bed liner side walls and provide a base for the attachment of vertically or horizontally affixed extruded strips 120 which have T-slots providing means for securing cargo and bed liner dividers such as exemplary dividers 122, 124. The horizontally formed ribs 118 provide a ledge to accept horizontally placed dividers such as divider 124.

It will also be seen in FIG. 4 that the side section 96 includes a formed wheel well cover 126 so that the attachment to an anchor rail such as rail 32 (FIG. 2) can be achieved using interlocking member 92 as previously described.

The bed liner 94 is assembled in the cargo bed of a truck by first engaging the side sections 96, 98, then placing the front segment 100 which is retained in position by the corner pieces 114, 116. Once this is done, the floor sections 104, 106 can be positioned leaving sufficient space to slide the side extrusions 108, 110 and central extrusion 112 into position as indicated in FIG. 4. As will be explained, once these sections are in position, they can be through bolted to the floor of the cargo bed to retain the structure in position and also to provide anchors for attachment of other parts such as a cross beam 128 used in combination with brackets 130 to locate the divider 122.

Figure 6:
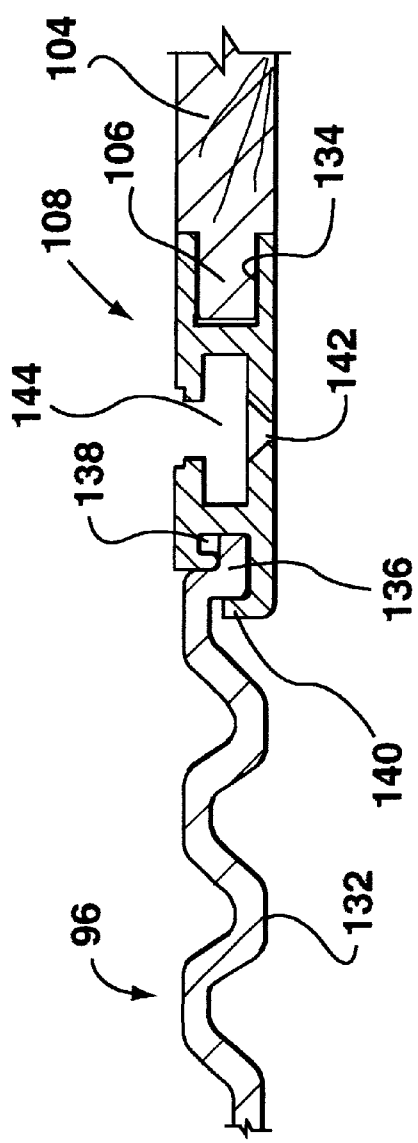
FIG. 6 is a cross-sectional view on line 6—6 of FIG. 4 and showing a preferred form of extruded strip used to secure the bed liner side and the floor of the bed liner to the floor of the pickup truck cargo bed.

The structure of the side extrusion 108 is better seen in FIG. 6. Here it will be seen that the side section 96 includes a corrugated floor portion 132 which meets the side extrusion 108. On the other side of the extrusion, the floor section 104 has a tongue 106 engaged in a recess 134 formed in the side extrusion 108.

The joint between the floor portion 132 and the side extrusion 108 is formed by an L-shaped portion 136 on the floor portion 132 engaged in a recess 138 having an upwardly extending lip 140 to trap the floor portion 96 in the side extrusion 108.

The side extrusion 108 also includes a downwardly opening bolt hole 142 which is countersunk to receive a suitable fastener, and this bolt hole is located at the bottom of a T-slot 144 to receive suitable bolts and other devices which can be useful in attaching cargo to the floor of the cargo bed.

Figure 7:
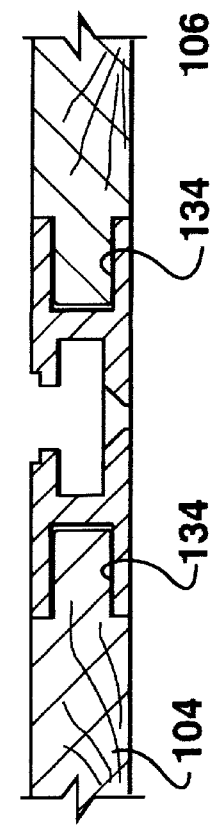
FIG. 7 is a cross-sectional view on line 7—7 of FIG. 4 and showing an extruded strip used to two secure two sections of the floor.

Reference is next made to FIG. 7 which illustrates the shape of the central extrusion 112. It will be seen that this extrusion is somewhat similar to the extrusion 108 with the exception that there are two recesses 134 to receive the similar floor sections 104, 106. It will be appreciated that various extrusions can be used. For instance, if it is necessary to provide substitutes for the floor sections 104, 106 of a shape similar to the floor portion 132 (FIG. 6) then an extrusion would be made having recesses 138 at both sides and complimentary lips 140 to trap the floor sections in place. Other variations are possible consistent with providing an extrusion which is attached to the bed of the pickup truck to positively lock the various parts of the bed liner in place and preferably to provide a T-slot for anchoring attachments, cargo, etc. to the bed of the pickup truck.

Figure 8:
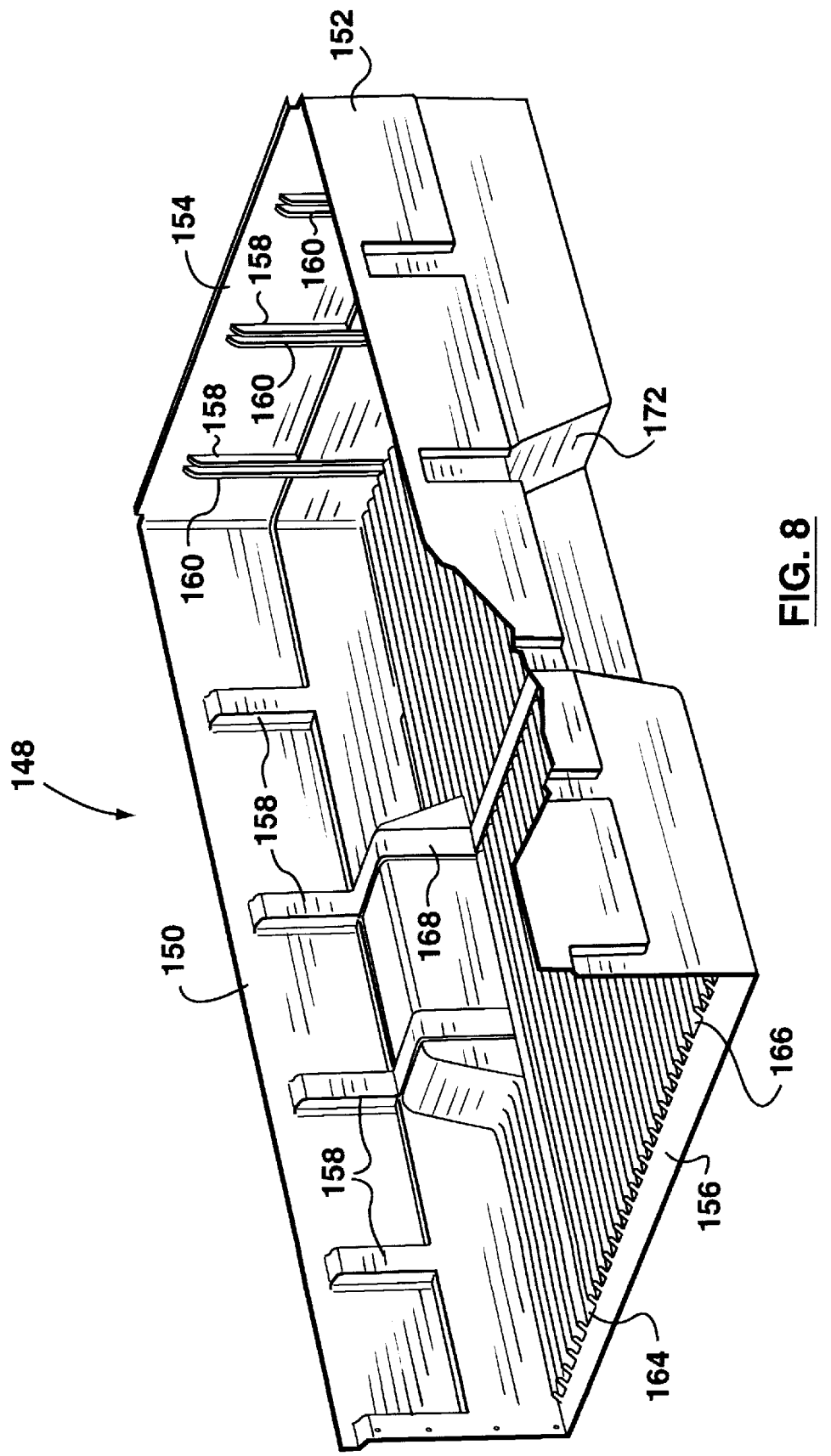
FIG. 8 is an isometric view of another embodiment of bed liner with portions broken away, the bed liner being formed in one piece.

Reference is now made to FIG. 8 which illustrates another embodiment of bed liner 148 having side sections 150, 152, front wall segment 154 and floor 156 formed in one piece. The bed liner 148 side sections 150, 152 and front wall segment 154 define a plurality of vertically formed protruding ribs 158 meant to accept a variety of vertically placed extruded strips 160 in the manner previously described with reference to FIG. 4., The strips define T-slots to secure cargo and vertical bed dividers 162 such as vertical divider 122 (FIG. 4). This embodiment also has a horizontally placed protrusion 162 meant to accept horizontally arranged cargo dividers and shelves.

The floor of the one piece bed liner 148 embodies a pair of integral elongate channels 164, 166 running lengthwise and adapted to accept suitable extruded connector strips (not shown) such as extrusions 108, 100 and 112 to facilitate bolting in place through the floor of the bed liner 148 and through the cargo bed of the pickup truck. The strips preferably include upwardly opening T-slots to act as anchoring points for securing cargo and cargo bed dividers, etc. Also, if preferred, a raised rib 168 is included and the rib extends across the liner 148 and extending continuously over the floor 156, side sections 150, 152 and wheel wells 170, 172. The rib 168 is perpendicular to the recessed channels 164, 166 provides a base for a crossbeam such as beam 128 (FIG. 4). The front wall includes a lip 174 at its top edge to engage over the front wall 154 of the truck bed. In this embodiment the side walls 150, 152 can be engaged with the walls of the pickup truck by simply engaging them under the pickup side walls, or using an attachment with rails such as rails 30, 32 (FIG. 1).

Figure 9:
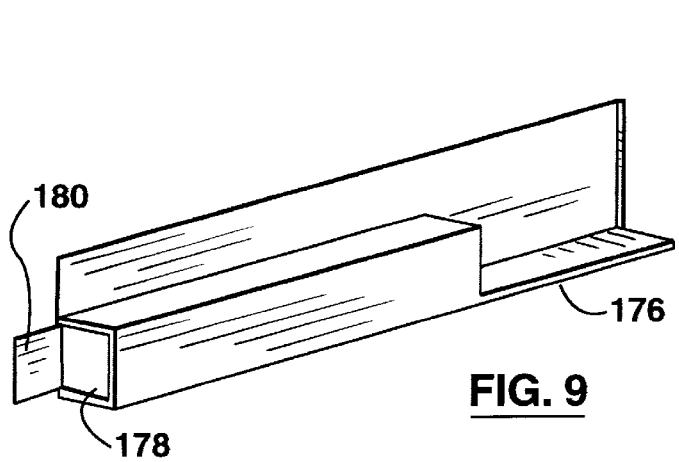
FIG. 9 is a somewhat diagrammatic isometric view of a bed liner side section used in a third embodiment of the bed liner, the bed liner side section being formed to incorporate a storage compartment behind the wheel well portion of the pick-up bed.
Figure 11:
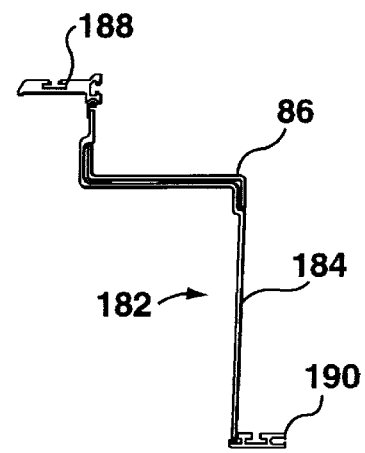
FIG. 11 is a cross-sectional view of FIG. 10 and showing an embodiment of the bed liner side section affixed to the anchor rail at the top and to an extruded attachment strip at the bottom.
Figure 10:
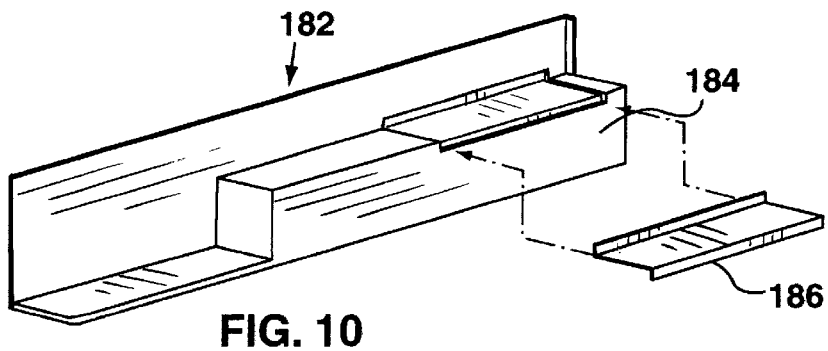
FIG. 10 is a a view similar to FIG. 9 and showing a bed liner side section formed to incorporate a storage compartment ahead of the wheel well portion of the pick-up bed.

FIGS. 9 to 11 illustrate more exemplary embodiments of bed liners having side sections formed to incorporate storage compartments. FIG. 9 shows a bed liner side section 176 with a storage compartment 178 which in use covers the wheel well portion of the cargo bed and provides access by an end door 180. FIG. 10 shows a bed liner side section 182 with a storage compartment 184 to be located in use in front of the wheel well portion of the cargo bed and having a lid 186.

FIG. 11 is a cross-sectional view of the bed liner side section 182 and how it is connected via an extrusion 184 to an anchor rail 188 as previously described. Also shown is a side extrusion used to attach the assembly to the floor of the bed of the pickup truck.

Figure 12:
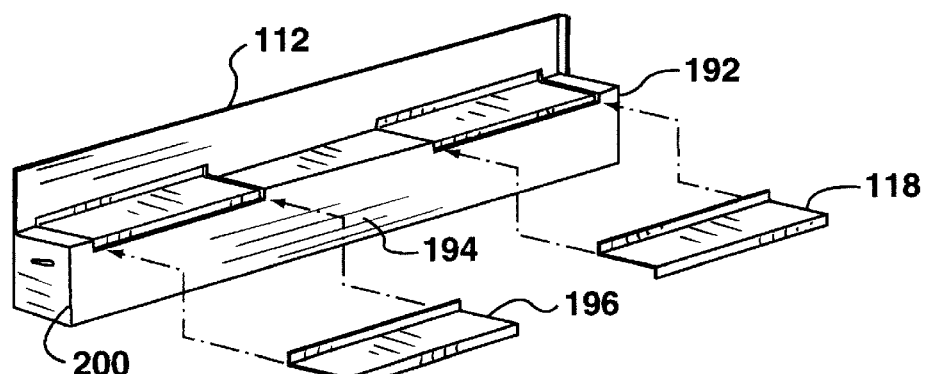
FIG. 12 is an isometric view of another bed liner side section formed to incorporate a storage compartment ahead of and behind the wheel well portion of the pick-up bed.

FIG. 12 shows a bed liner side section 112 with a storage compartment 194 located the full length of the cargo bed.

Access to the storage compartments can either be through top lids 196, 198 or through an end door 200 of the compartment. All of the doors can have locks. The height of the compartments can be increased up to the anchor rail 188 (FIG. 10).

The cargo anchoring and protection system provides numerous possibilities for securing cargo. The anchoring rails 30, 32 (FIG. 2) and anchor beam 34 can be combined to provide support for cargo using suitable fittings in the numerous T-slots provided in these parts.

Also, as shown in some of the drawings, the bed liners can be used with connector strips in the form of extrusions bolted to the floor to also provide cargo anchoring capabilities. These extrusions can be combined with the anchor rails and beam to receive dividers and load supports. FIG. 1 showed other components that can optionally be combined with the inventive bed liner to provide a comprehensive cargo anchoring and protection system.

It will also be appreciated that the combinations of bed liners and anchor rails permits the use of storage compartments built into the bed liner to take advantage of the space about wheel wells. The extrusions used in the floor to hold the floor of the lines in place will prevent items travelling from the storage compartments under the floor of the liner.

Figure 13:
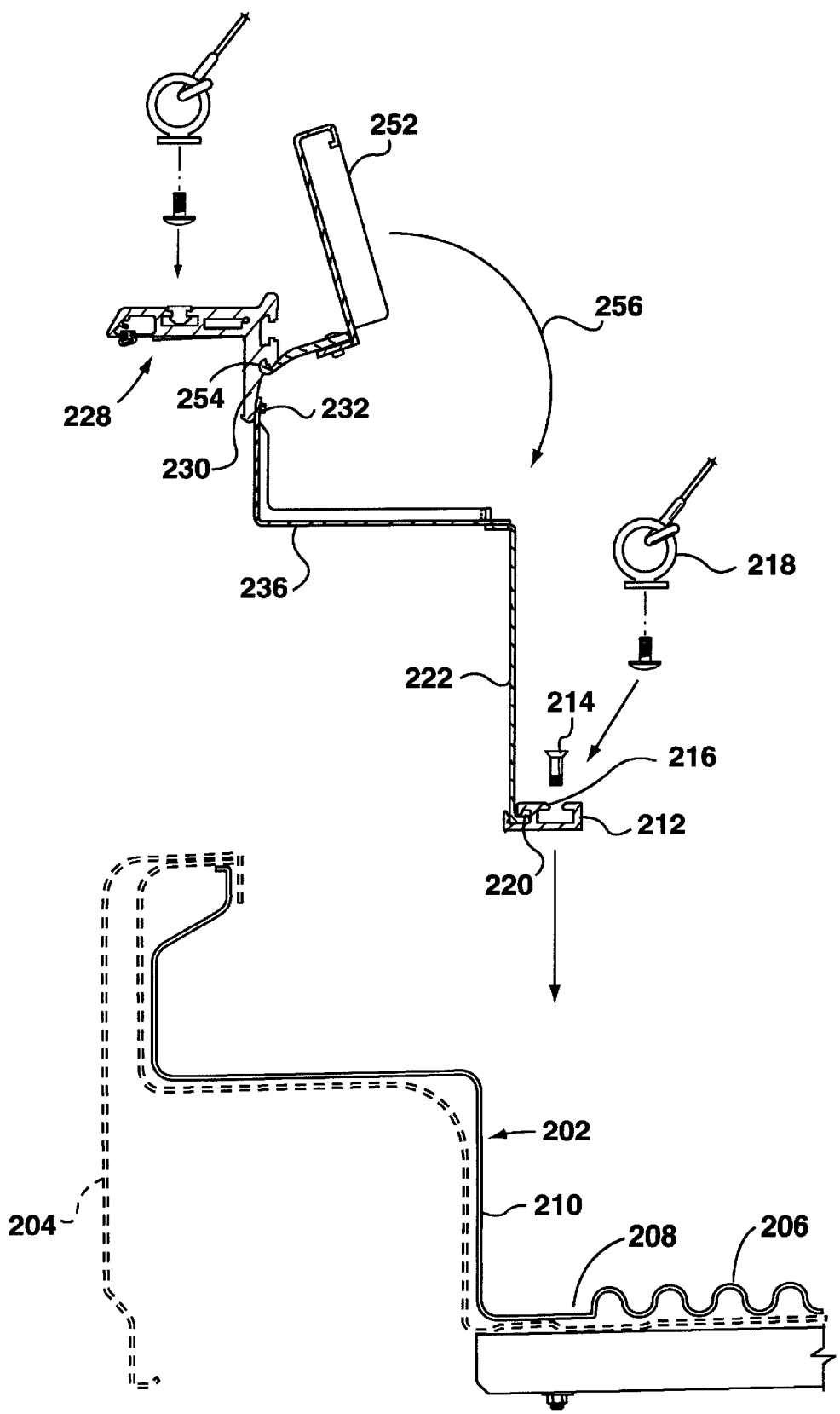
FIG. 13 is an exploded sectional view of another embodiment of bed liner associated with an alternative embodiment of anchor rail.
Figure 14:
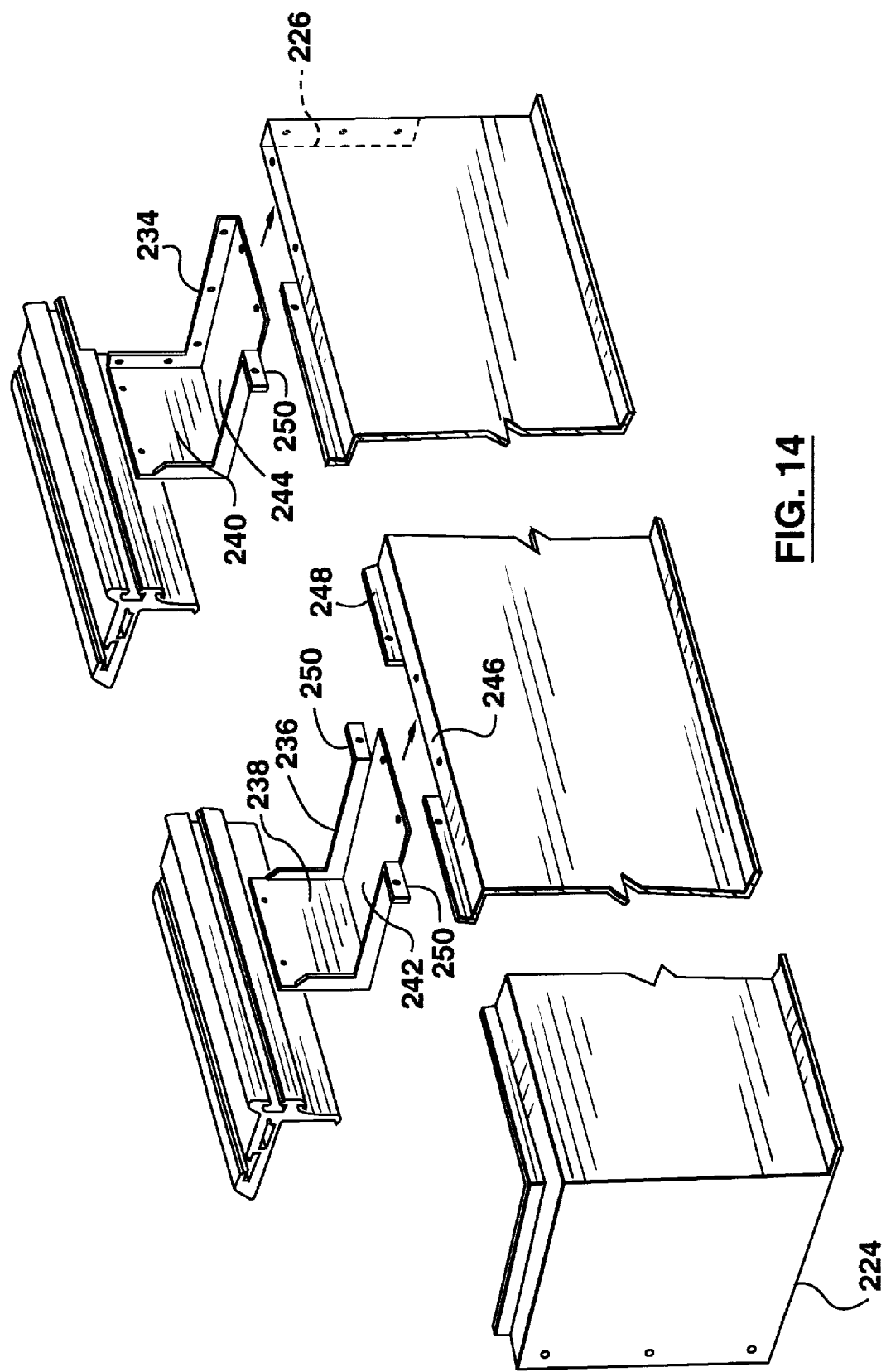
FIG. 14 is an exploded isometric view of parts of the bed liner shown in FIG. 13.

A variation to the previous embodiments of bed liner is found in FIGS. 13 and 14. As seen in FIG. 13, a open-piece molded bed liner 202 is positioned inside the side wall 204 of a pickup truck cargo bed in conventional manner. The bed liner has the usual corrugated floor 206 with the exception that channels 208 (one of which is seen) is provided adjacent an upright wall 210 running the length of the bed liner. This channel is adapted to receive a connector strip 212 in the form of an extrusion which fits in the channel 208 and is held in place by a bolt 214 which attaches to the floor of the pickup truck. The extruded connector strip 212 includes a T-slot 216 for receiving a conventional anchor 218 for attaching loads. The extrusion also defines an L-shaped slot 220 to receive a bottom end of a compartment wall 222 which is also seen in FIG. 14. This wall can be made to extend the length of the pickup truck cargo bed and terminates at a rear end in an end wall 224 and at the front end in an attaching strip 226.

In this case, anchor rails 228 are provided (one to each side of the truck) having similar characteristics to the anchor rails 30, 32 (FIG. 2) but further including a downward projection 230 which is provided to receive fasteners 232 used to attach a forward bracket 234 (FIG. 14) and an intermediate bracket 236 (seen also in FIG. 13). The brackets include respective upright portions 238, 240 for attachment to the downward projection 230 on the anchor rails 228 and horizontal portions 242, 244 which meet a horizontal flange 246 at the top of the compartment wall 222 for attachment to the flange 246. The horizontal flange 246 extends towards the anchor rail 228 and terminates at an interrupted upright flange 248 defining gaps to receive the horizontal portions 242, 244 for attachment. The upright flange 248 is also attached to tabs 250 on the respective brackets 234, 236 for further reinforcement. It will be appreciated from a review of FIGS. 13 and 14 that the structure provides a compartment which covers portions of the bed liner 202 resulting in storage space defined by the bed liner 202 and the structure shown in FIG. 14. Top openings are covered by a pair of suitable lids 252 (FIG. 13) which is slipped into a suitable recess 254 in the side rail 228 to permit limited rotation between an open position shown in FIG. 13 and a closed position indicated by the arrow 256.

The doors are shaped to come into contact with the brackets 234, 236 so that rain will pass from the doors to the brackets and then over the sides of the structure to fall onto the bed liner 202.

With this structure, because of the combination of the bed liner 202 and the compartment structure shown in FIGS. 13 and 14, any items placed in the compartment by opening the lids 252 will remain in the compartment and have no opportunity to become lost due to travelling under the bed liner. The lids can be secured by locking (not shown) so that the resulting structure forms a desirable storage space.

Variations can be made consistent with the general principle described with reference to FIGS. 13 and 14.

Various other embodiments are possible and such embodiments are included within the scope of the description and claims.

What is claimed is:

1. A cargo anchoring and protection system for attachment to the cargo bed of a pickup truck, the system including:
   a pair of anchor rails for attachment to the respective tops of the side walls of the cargo bed, each of the anchor rails including a channel extending along the length of the rail for opening into the cargo bed;
   a bed liner having side sections and a floor; and
   interlocking members adapted to be slidably engaged in the respective channels and including structure for attaching the members to the side sections of the bed liner to locate and retain the bed liner relative to the side rails.

2. A cargo anchoring and protection system as claimed in claim 1 in which the floor of the bed liner includes at least one separate floor section.

3. A cargo anchoring and protection system as claimed in claim 2 and further including connector strips engageable with the respective side sections and the floor section to locate the floor section between the side sections, and fasteners for attaching the connector strips to the floor of the cargo bed.

4. A cargo anchoring and protection system as claimed in claim 3 in which the floor section is made of wood and the side sections are of plastics materials.

5. A cargo anchoring and protection system as claimed in claim 1 and further including at least one connector strip positioned on the floor of the bed liner to receive fasteners passing through the strip, the floor, and also through the floor of the cargo bed to positively attach the floor of the bed liner to the pickup truck.

6. A cargo anchoring and protection system as claimed in claim 5 in which the connector strip defines an upwardly opening T-slot to receive anchors and the like for restraining cargo in the cargo bed.

7. A cargo anchoring and protection system as claimed in claim 1 and further including at least one compartment structure attached to one of the side sections.

8. A cargo anchoring and protection system as claimed in claim 7 in which the compartment structure includes lids to provide top access to the compartment structure.

9. A cargo anchoring and protection system as claimed in claim 7 in which the compartment structure includes an end door to provide access to the compartment from behind the pickup truck.

10. A cargo anchoring and protection system as claimed in claim 1 in which the side sections are proportioned for location against the side walls of the pickup truck.

11. A cargo anchoring and protection system as claimed in claim 10 in which the floor is made up of at least one floor section for extending between the side sections.

12. A cargo anchoring and protection system as claimed in claim 11 and further comprising connector strips between the floor section and the side sections for attachment to the floor of the pickup truck cargo bed to positively attach the bed liner floor section and side sections.

13. A cargo anchoring and protection system as claimed in claim 12 in which the connector strips include upwardly opening T-slots for receiving anchors to tie down loads in the cargo bed.

14. A cargo anchoring and protection system as claimed in claim 10 in which the side sections define at least one storage compartment.

15. A cargo anchoring and protection system as claimed in claim 14 in which at least one of the side sections includes a lid on the storage compartment.

* * * * *